United States Patent
Jung et al.

(10) Patent No.: US 7,773,705 B2
(45) Date of Patent: Aug. 10, 2010

(54) APPARATUS AND METHOD FOR CANCELING NEIGHBOR CELL INTERFERENCE IN BROADBAND WIRELESS COMMUNICATION SYSTEM

(75) Inventors: Yun-Ho Jung, Suwon-si (KR); Bong-Gee Song, Seongnam-si (KR); Tae-Hee Han, Seoul (KR); Min-Cheol Park, Suwon-si (KR); Seo-Goo Lee, Anyang-si (KR); In-Hyoung Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 812 days.

(21) Appl. No.: 11/725,767

(22) Filed: Mar. 20, 2007

(65) Prior Publication Data

US 2007/0249350 A1     Oct. 25, 2007

(30) Foreign Application Priority Data

Mar. 20, 2006 (KR) .................. 10-2006-0025476

(51) Int. Cl.
    *H04B 7/10* (2006.01)
(52) U.S. Cl. .................. 375/347; 455/436; 455/63.1
(58) Field of Classification Search ............. 375/347, 375/267; 455/436, 450, 525, 63.1
    See application file for complete search history.

(56) References Cited

U.S. PATENT DOCUMENTS

| 2003/0002490 | A1  | 1/2003 | Wong et al. |
| 2004/0081121 | A1  | 4/2004 | Xu |
| 2006/0002360 | A1  | 1/2006 | Ji et al. |
| 2007/0147538 | A1* | 6/2007 | Jung et al. .................. 375/267 |
| 2007/0149242 | A1* | 6/2007 | Kim et al. .................. 455/525 |
| 2008/0108363 | A1* | 5/2008 | Yu et al. .................... 455/450 |

FOREIGN PATENT DOCUMENTS

| EP | 1 318 613      | 12/2002 |
| KR | 1020070067311  | 6/2007  |
| KR | 1020070077709  | 7/2007  |

* cited by examiner

*Primary Examiner*—Temesghen Ghebretinsae
(74) *Attorney, Agent, or Firm*—The Farrell Law Firm, LLP

(57) ABSTRACT

Disclosed are an apparatus and method for canceling a neighbor cell interference in a broadband wireless communication system.

9 Claims, 5 Drawing Sheets

APPARATUS AND METHOD FOR CANCELING NEIGHBOR CELL INTERFERENCE IN BROADBAND WIRELESS COMMUNICATION SYSTEM

PRIORITY

This application claims the benefit under 35 U.S.C. 119(a) of an application entitled "Apparatus And Method For Canceling Neighbor Cell Interference In Broadband Wireless Communication System" filed in the Korean Intellectual Property Office on Mar. 20, 2006 and assigned Serial No. 2006-25476, the contents of which are incorporated herein by reference.

BACKGROUND OF THE INVENTION

1. Field of the Invention

The present invention relates to an apparatus and method for canceling a neighbor cell interference in a broadband wireless communication system, and more particularly to an apparatus and method for canceling a neighbor cell interference by using multiple receiving antennas in a broadband wireless communication system.

2. Description of the Related Art

In general, wireless communication systems use a cellular communication system, which divides its service area into a plurality of sub-areas (i.e., cells) and provides communication service in order to overcome the limitations of the service area and subscriber capacity. Furthermore, since the cellular communication system provides communication service according to the divided cells, it is possible to spatially reuse a frequency by allowing two cells sufficiently spaced from each other to use the same frequency band. Accordingly, the cellular communication system can accommodate a sufficient number of subscribers by increasing the number of spatially-distributed channels. However, a wireless communication system having a frequency reuse factor of 1 has an excellent frequency efficiency but has a problem in that reception performance is deteriorated due to interference by a neighbor cell.

For this reason, it is stipulated in the IEEE 802.16 standard for the broadband wireless communication system that a signal of a base station should be modulated by a low level such as the quadrature phase shift keying (QPSK), a low forward error correction rate should be employed, and the repetition process should be allowed to be used a maximum of six times. Nevertheless, on a fading channel, when a conventional mobile station is used, a high outage probability, which indicates a probability of failure in receiving data, becomes higher around a cell boundary, so that the handover performance is deteriorated. Particularly, since an DL-MAP message, which occupies the most important position in the reception performance and handover, is transferred to all base stations from the same position, interference between base stations is great, so it is necessary to develop an interference cancellation method for improving the DL-MAP message reception performance.

Meanwhile, FIG. 1 is a block diagram illustrating the configuration of a system model for a mobile station which has two antennas and is located around a cell boundary.

A mobile station 104 is located within the cell area of a serving base station 100 and receives a target signal from the serving base station 100.

Thereafter, when the mobile station 104 moves to a handoff area, i.e., a cell boundary area, of the serving base station 100 and a neighbor base station 102, the mobile station 104 receives not only a target signal for performing communication with the serving base station 100, but also an interference signal from the neighbor base station 102.

In this case, since the mobile station 104 has multiple receiving antennas, the mobile station 104 receives both of reception signals defined by Equations (1) and (2) below.

$$y_1(k) = h_S^{(1)}(k) x_S(k) + h_I^{(1)}(k) x_I(k) + n_1(k) \quad (1)$$

$$y_2(k) = h_S^{(2)}(k) x_S(k) + h_I^{(2)}(k) x_I(k) + n_2(k) \quad (2)$$

Herein, $y_i(k)$ represents a reception signal of an $i^{th}$ receiving antenna, $h_S^{(i)}(k)$ represents a channel frequency response between the serving base station 100 and the $i^{th}$ receiving antenna of the mobile station 104, and $h_I^{(i)}(k)$ represents a channel frequency response between the neighbor base station 102 and the $i^{th}$ receiving antenna of the mobile station 104. $x_S^{(i)}(k)$ represents a signal transmitted from the serving base station 100, $x_I^{(i)}(k)$ represents a signal transmitted from the neighbor base station 102, and n(k) represents an additive white Gaussian noise corresponding to an $k^{th}$ sub-channel.

The signals defined by Equations (1) and (2), which are received by the mobile station 104 through the multiple receiving antennas, can be expressed as a determinant defined by Equation (3) below.

$$Y = \begin{bmatrix} y_1(k) \\ y_2(k) \end{bmatrix} = \begin{bmatrix} h_S^{(1)}(k) & h_I^{(1)}(k) \\ h_S^{(2)}(k) & h_I^{(2)}(k) \end{bmatrix}$$

$$\begin{bmatrix} x_S(k) \\ x_I(k) \end{bmatrix} + \begin{bmatrix} n_1(k) \\ n_2(k) \end{bmatrix} = H'X' + N \quad (3)$$

Equation (3) is identical to a typical multi-input multi-output (MIMO) model. That is, since the mobile station 104 simultaneously receives the signals of the serving base station 100 and neighbor base station 102 through the multiple receiving antennas although each of the serving base station 100 and neighbor base station 102 has one transmitting antenna, the mobile station 104 has the same reception model as the MIMO system.

The MIMO system can estimate and detect the target signal component independently of the interference signal by using various MIMO signal detection techniques, such as a linear minimum mean square error (MMSE) detection technique, a linear zero-forcing linear detection technique, a zero-forcing V-BLAST (Vertical Bell-Lab Layered Space Time), an MMSE V-BLAST scheme, etc., in which the linear MMSE detection technique is most proper for cancellation of interference.

Hereinafter, a method of estimating a target signal component based on the linear MMSE detection technique will be described as an example.

A defining equation using the linear MMSE detection technique may be expressed as the following Equation (4).

$$\tilde{x}_S(k) = <(H'^H H' + \alpha I)^{-1} \cdot H'^H>_i \cdot Y \quad (4)$$

Herein, α represents an inverse number of a signal-to-noise ratio (SNR), and I represents a unit matrix having a size of [2×2]. Also, $(\cdot)^H$ represents a conjugate-transpose operation for a matrix, and $<\cdot>_i$ represents an $i^{th}$ row in a matrix.

As shown in Equation (4), the linear MMSE detection technique includes multiple times of complex-matrix multiplication operations and inverse-matrix operations. Accordingly, the linear MMSE detection technique requires a great number of operations, so that there is a problem in that the hardware becomes more complicated when the linear MMSE detection technique is implemented.

SUMMARY OF THE INVENTION

Accordingly, the present invention has been made to solve the above-mentioned problems occurring in the prior art, and the present invention provides an apparatus and method for efficiently canceling an interference signal in order to improve the DL-MAP reception performance in a broadband wireless communication system.

Also, the present invention provides an apparatus and method for reducing the complexity of hardware when the linear MMSE detection technique is used to cancel an interference in the broadband wireless communication system.

In addition, the present invention provides an apparatus and method for reducing the complexity of the operation for MMSE nulling vectors by setting an equation defined by the present invention as a channel state information value in the broadband wireless communication system.

In accordance with an aspect of the present invention, there is provided a mobile station for receiving a target signal and a neighbor signal through at least two receiving antennas from a serving base station and neighbor base stations, and canceling the neighbor signal from among the received signals so as to cancel a neighbor cell interference in a wireless communication system, the mobile station including: an operator for performing a Fourier transform operation with respect to the target signal and neighbor signal received through each of the receiving antennas; a channel estimator for receiving the Fourier-transformed signals from the operator, and estimating a frequency response of each channel received from the serving base station and neighbor base station; and a detector for detecting a target signal defined by a following Equation from the received signals by using the estimated channel frequency response, $$\tilde{x}_S(k) = CSI \cdot \frac{1}{r_{NN}^2} \cdot z_N^H \cdot \underline{Y} = \left( r_{NN}^2 \cdot \prod_{i=1}^{N-1} \|h_i\|^2 \right) \cdot \frac{1}{r_{NN}^2} \cdot$$
$$z_N^H \cdot \underline{Y} = u_N^H \cdot \underline{Y},$$

wherein CSI refers to channel state information defined by a following Equation, $r_{NN}$ represents a QR decomposition component of a channel frequency response matrix $\underline{H}$, $\|h_i\|$ represents the norm of a frequency response, $\underline{Y}$ represents a reception signal matrix of N antennas, and $u_N$ represents a linear minimum mean square error (MMSE) detection nulling vector, $$CSI = r_{NN}^2 \cdot \prod_{i=1}^{N-1} \|h_i\|^2.$$

In accordance with another aspect of the present invention, there is provided a method for canceling a neighbor signal from received signals in a mobile station, which has at least two receiving antennas to receive a target signal and the neighbor signal from a serving base station and neighbor base stations, in order to cancel a neighbor cell interference, the method comprising the steps of: estimating each channel frequency response by using the received signals; and detecting a target signal defined by a following Equation from the received signals with the received signals and estimated channel frequency response, $$\tilde{x}_S(k) = CSI \cdot \frac{1}{r_{NN}^2} \cdot z_N^H \cdot \underline{Y} = \left( r_{NN}^2 \cdot \prod_{i=1}^{N-1} \|h_i\|^2 \right) \cdot \frac{1}{r_{NN}^2} \cdot$$
$$z_N^H \cdot \underline{Y} = u_N^H \cdot \underline{Y},$$

wherein CSI refers to channel state information defined by a following Equation, $r_{NN}$ represents a QR decomposition component of a channel frequency response matrix $\underline{H}$, $\|h_i\|$ represents the norm of a frequency response, $\underline{Y}$ represents a reception signal matrix of N antennas, and $u_N$ represents a linear minimum mean square error (MMSE) detection nulling vector, $$CSI = r_{NN}^2 \cdot \prod_{i=1}^{N-1} \|h_i\|^2.$$

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

In the following description of the embodiment of the present invention, a detailed description of known functions and configurations incorporated herein will be omitted when it may obscure the subject matter of the present invention. In addition, the terminology used in the description is defined in consideration of the function of corresponding components used in the present invention and may be varied according to users, operator's intention, or practices. Accordingly, the definition must be interpreted based on the overall content disclosed in the description.

Figure 2:
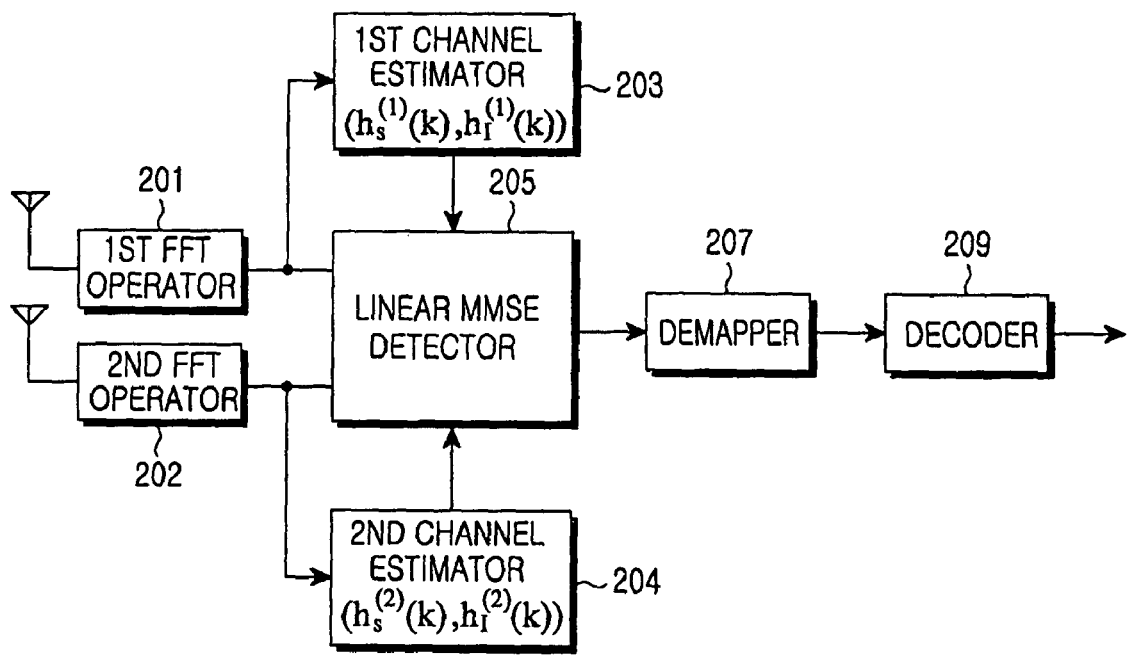
FIG. 2 is a block diagram illustrating the configuration of a mobile station for canceling a neighbor cell interference according to an embodiment of the present invention.

FIG. 2 is a block diagram illustrating the configuration of a mobile station for canceling a neighbor cell interference according to an embodiment of the present invention.

For a better understanding of the present invention, the following description will be given with respect to a system model for a mobile station which has two receiving antennas, is located around a cell boundary area, and receives signals from two base stations including a serving base station and a neighbor base station, like the mobile station shown in FIG. 1, according to an embodiment of the present invention. Herein, a signal received from the neighbor base station may be a signal having the greatest intensity among signals received from a plurality of neighbor base stations.

As shown in FIG. 2, the mobile station includes fast Fourier transform (FFT) operators 201 and 202, channel estimators 203 and 204, a linear MMSE detector 205, a demapper 207 and a decoder 209.

The FFT operators 201 and 202 perform fast Fourier transform operation with respect to a target signal and neighbor signal of a time domain, which have been received through the antennas, according to each antenna, thereby transforming the time-domain signals into frequency-domain signals.

The channel estimators 203 and 204 receive the Fourier-transformed signals from the FFT operators 201 and 202, and estimate the frequency responses $h_S^{(1)}(k)$, $h_S^{(2)}(k)$, $h_I^{(1)}(k)$ and $h_I^{(2)}(k)$ of each channel by using preamble signals received from the serving base station and neighbor base station.

The linear MMSE detector 205 calculates an MMSE null vector by using the channel values estimated by the channel estimators 203 and 204, and estimates and detects a target signal component by using the calculated MMSE null vector. The MMSE null vector is calculated as follows.

First, when a column switching is applied to Equation (3) in order to efficiently implement the linear MMSE detection technique, Equation (3) is expressed as the following Equation (5).

$$Y = \begin{bmatrix} y_1(k) \\ y_2(k) \end{bmatrix} = \begin{bmatrix} h_I^{(1)}(k) & h_S^{(1)}(k) \\ h_I^{(2)}(k) & h_S^{(2)}(k) \end{bmatrix} \begin{bmatrix} x_I(k) \\ x_S(k) \end{bmatrix} + \begin{bmatrix} n_1(k) \\ n_2(k) \end{bmatrix} = HX + N \quad (5)$$

Based on Equation (5), matrixes $\underline{H}$ and $\underline{Y}$ are defined by Equations (6) and (7) below.

$$\underline{H} = \begin{bmatrix} H \\ \sqrt{\alpha}\, I \end{bmatrix} = \begin{bmatrix} \vdots & \vdots \\ \underline{h}_1 & \underline{h}_2 \\ \vdots & \vdots \end{bmatrix} = \begin{bmatrix} h_I^{(1)}(k) & h_S^{(1)}(k) \\ h_I^{(2)}(k) & h_S^{(2)}(k) \\ \sqrt{\alpha} & 0 \\ 0 & \sqrt{\alpha} \end{bmatrix} \quad (6)$$

$$\underline{Y} = \begin{bmatrix} Y \\ 0 \end{bmatrix} = \begin{bmatrix} y_1(k) \\ y_2(k) \\ 0 \\ 0 \end{bmatrix} \quad (7)$$

With the defined matrixes $\underline{H}$ and $\underline{Y}$ the linear MMSE detection technique of Equation (4) described above may be rearranged as Equation (8) below.

$$\tilde{x}_S(k) = \langle (H^H H + \alpha I)^{-1} \cdot H^H \rangle_2 \cdot Y = \langle (\underline{H}^H \underline{H})^{-1} \cdot \underline{H}^H \rangle_2 \cdot \underline{Y} \quad (8)$$

In the second term of Equation (8), $(\underline{H}^H \underline{H})^{-1} \cdot \underline{H}^H$ represents a pseudo-inverse operation of matrix $\underline{H}$. Referring to Equation (8), it can be understood that a term of $\alpha \cdot I$ has disappeared. The fact is that the term of $\alpha \cdot I$ is not eliminated but is included in the defined matrix $\underline{H}$. Since it is difficult to simplify Equation (4) through a QR decomposition process if the term of $\alpha \cdot I$ is left in the Equation, the matrixes $\underline{H}$ and $\underline{Y}$ are defined by Equations (6) and (7).

When the QR decomposition process is performed with respect to the defined matrix $\underline{H}$ in order to simplify Equation (8), the following Equation (9) is derived.

$$\underline{H} = \underline{Q}\underline{R} = \begin{bmatrix} \vdots & \vdots \\ q_1 & q_2 \\ \vdots & \vdots \end{bmatrix} \begin{bmatrix} r_{11} & r_{21} \\ 0 & r_{22} \end{bmatrix} \quad (9)$$

Herein, matrix Q represents a unitary matrix of $Q^H \cdot Q = Q \cdot Q^H = I$, matrix R represents an upper-triangular matrix, a lower triangular matrix of which has 0s. When Equation (9) is substituted into Equation (8) with such features of the matrixes Q and R, the following Equation (10) is derived.

$$\tilde{x}_S(k) = \langle R^{-1} \cdot Q^H \rangle_2 \cdot \underline{Y} = \frac{1}{r_{22}} \cdot q_2^H \cdot \underline{Y} \quad (10)$$

As shown in Equation (10), if just r22 and q22 components are obtained through the QR decomposition process, it is possible to implement the linear MMSE detection technique. When the QR decomposition is performed according to the Gramm-Schmidt Orthogonalization (GSO) process, the r22 and q22 components can be obtained as shown in Equations (11) to (13).

$$z_2 = \underline{h}_2 - \frac{(\underline{h}_1^H \underline{h}_2)\underline{h}_1}{\|\underline{h}_1\|^2} \quad (11)$$

$$r_{22} = \|z_2\| \quad (12)$$

$$q_2 = \frac{z_2}{r_{22}} \quad (13)$$

Herein, $\|\cdot\|^2$ represents the norm of a vector. When Equations (11) to (13) are substituted into Equation (10), the linear MMSE detection technique can be redefined by Equation (14).

$$\tilde{x}_s(k) = \langle R^{-1} \cdot Q^H \rangle_2 \cdot \underline{Y} = \frac{1}{r_{22}^2} \cdot z_2^H \cdot \underline{Y} \quad (14)$$

In Equation (14), $R^{-1} Q^H$ represents a nulling matrix, and $(R^{-1} \cdot Q^H)_2$ represents an MMSE nulling vector to detect the target signal $\tilde{x}_S(k)$.

As described above, the most important factor to support a smooth handover through improvement of the reception performance of the mobile station is whether a DL-MAP message is received. Therefore, when it is assumed that an interference cancellation technique is applied to a DL-MAP section, Equation (14) may be further simplified. Actually, in the mobile station, a detected signal is multiplied by channel state information (CSI) in order to calculate the repetition combining and log-likelihood ratio (LLR). In this case, since a DP-MAP message has been QPSK-modulated and the QPSK modulation scheme is not susceptible to a CSI value in the calculation of the repetition combining and LLR, the CSI value may be defined by Equation (15).

$$CSI = r_{22}^2 \|\underline{h}_1\|^2 \quad (15)$$

When Equation (15) is reflected in Equation (14), the following Equations (16) and (17) may be obtained.

$$\tilde{x}_S(k) = CSI \cdot \frac{1}{r_{22}^2} \cdot z_2^H \cdot \underline{Y} = r_{22}^2 \cdot \|\underline{h}_1\|^2 \cdot \frac{1}{r_{22}^2} \cdot z_2^H \cdot \underline{Y} = u_2^H \cdot \underline{Y} \quad (16)$$

$$u_2 = \|\underline{h}_1\|^2 z_2 \quad (17)$$

$$= \|\underline{h}_1\|^2 \left| \underline{h}_2 - \frac{(\underline{h}_1^H \underline{h}_2) \underline{h}_1}{\|\underline{h}_1\|^2} \right|$$

$$= \|\underline{h}_1\|^2 \underline{h}_2 - (\underline{h}_1^H \underline{h}_2) \underline{h}_1$$

In Equation (17), since two lower elements of the vector $\underline{Y}$ have a value of "0" obtaining two higher elements in Equation (17) enables the implementation of Equation (16).

Referring to Equations (19) to (22), which are final resulting Equations of the present invention, it can be understood that the inverse-matrix operation has been eliminated and also the number of operations is significantly reduced, as compared with Equation (4) which is the original equation.

$$\tilde{x}_s(k) = u_2^H \cdot \underline{Y} = [u_2^{(1)*}(k) \, u_2^{(2)*}(k)] \cdot \begin{bmatrix} y_1(k) \\ y_2(k) \end{bmatrix} \quad (18)$$

$$u_2^{(1)}(k) = a h_s^{(1)}(k) - b h_I^{(1)}(k) \quad (19)$$

$$u_2^{(2)}(k) = a h_s^{(2)}(k) - b h_I^{(2)}(k) \quad (20)$$

$$a = \|h_I^{(1)}(k)\|^2 + \|h_I^{(2)}(k)\|^2 = \alpha \quad (21)$$

$$b = h_I^{(1)*}(k) h_s^{(1)}(k) + h_I^{(2)*}(k) h_s^{(2)}(k) \quad (22)$$

In Equations (19) and (20), $u_2^{(1)}(k)$ and $u_2^{(2)}(k)$ represent approximate MMSE nulling vectors. Hereinafter, the approximate MMSE nulling vector will be referred to as an "MMSE nulling vector."

Figure 1:
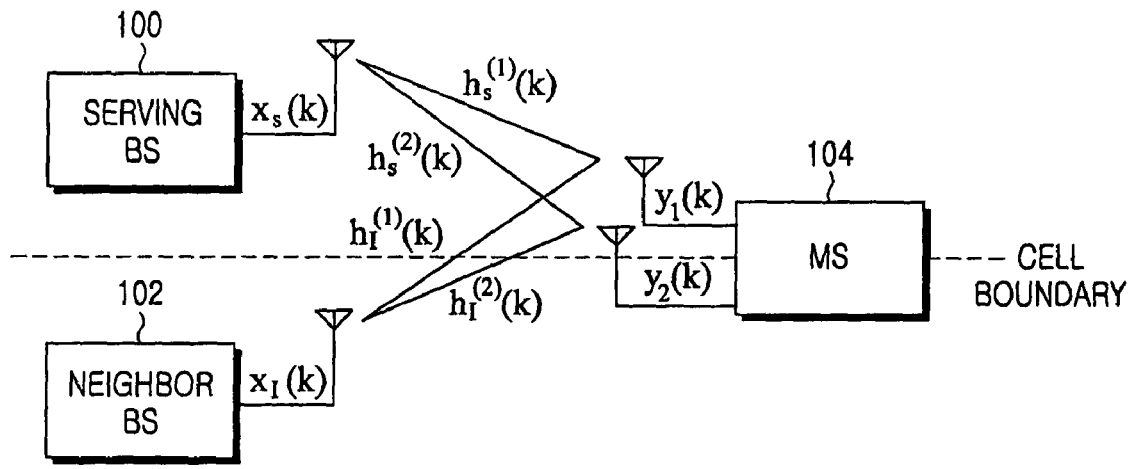
FIG. 1 is a block diagram illustrating the configuration of a conventional system model for a mobile station which has two antennas and is located around a cell boundary.

For a better understanding of the present invention, the present invention has been described about the system model for the mobile station which has two receiving antennas, is located around a cell boundary area, and receives signals from two base stations including a serving base station and a neighbor base station, like the mobile station shown in FIG. 1, according to an embodiment of the present invention.

Hereinafter, with respect to a system model for a mobile station which has N receiving antennas, is located around a cell boundary area, and receives signals from one serving base station and N−1 neighbor base stations, Equations (23) to (35) corresponding to Equations (1) to (22) will be described. The following Equations are similar to the aforementioned Equations, so a detailed description will be omitted.

$$y_1(k) = h_S^{(1)}(k) \cdot x_S(k) + h_{I_1}^{(1)}(k) \cdot x_{I_1}(k) + \quad (23)$$
$$h_{I_2}^{(1)}(k) \cdot x_{I_2}(k) + \ldots + h_{I_{Ni}}^{(1)}(k) \cdot x_{I_{Ni}} + n_1(k)$$

$$y_2(k) = h_S^{(2)}(k) \cdot x_S(k) + h_{I_1}^{(2)}(k) \cdot x_{I_1}(k) +$$
$$h_{I_2}^{(2)}(k) \cdot x_{I_2}(k) + \ldots + h_{I_{Ni}}^{(2)}(k) \cdot x_{I_{Ni}} + n_2(k)$$

$$\vdots$$

$$y_N(k) = h_S^{(N)}(k) \cdot x_S(k) + h_{I_1}^{(N)}(k) \cdot x_{I_1}(k) +$$
$$h_{I_2}^{(N)}(k) \cdot x_{I_2}(k) + \ldots + h_{I_{Ni}}^{(N)}(k) \cdot x_{I_{Ni}} + n_N(k)$$

Equation (23), which corresponds to Equations (1) and (2), expresses signals received through N receiving antennas from N base stations.

$$Y = \begin{bmatrix} y_1(k) \\ y_2(k) \\ \vdots \\ y_N(k) \end{bmatrix} \quad (24)$$

$$= \begin{bmatrix} h_S^{(1)}(k) & h_{I_1}^{(1)}(k) & h_{I_2}^{(1)}(k) & \ldots & h_{I_{Ni}}^{(1)}(k) \\ h_S^{(2)}(k) & h_{I_1}^{(2)}(k) & h_{I_2}^{(2)}(k) & \ldots & h_{I_{Ni}}^{(2)}(k) \\ \vdots & \vdots & \vdots & \vdots & \vdots \\ h_S^{(N)}(k) & h_{I_1}^{(N)}(k) & h_{I_2}^{(N)}(k) & \ldots & h_{I_{Ni}}^{(N)}(k) \end{bmatrix} \begin{bmatrix} x_S(k) \\ x_{I_1}(k) \\ \vdots \\ x_{I_{Ni}}(k) \end{bmatrix} +$$

$$\begin{bmatrix} n_1(k) \\ n_2(k) \\ \vdots \\ n_N(k) \end{bmatrix}$$

$$= H' \cdot X' + N$$

Equation (24) corresponds to Equation (3) and expresses the signals received through N receiving antennas from N base stations, which are expressed in Equation (23), as a matrix.

$$Y = \begin{bmatrix} y_1(k) \\ y_2(k) \\ \vdots \\ y_N(k) \end{bmatrix} \quad (25)$$

$$= \begin{bmatrix} h_{I_1}^{(1)}(k) & h_{I_2}^{(1)}(k) & h_{I_3}^{(1)}(k) & \ldots & h_S^{(1)}(k) \\ h_{I_1}^{(2)}(k) & h_{I_2}^{(2)}(k) & h_{I_3}^{(2)}(k) & \ldots & h_S^{(2)}(k) \\ \vdots & \vdots & \vdots & \vdots & \vdots \\ h_{I_1}^{(N)}(k) & h_{I_2}^{(N)}(k) & h_{I_3}^{(N)}(k) & \ldots & h_S^{(N)}(k) \end{bmatrix} \begin{bmatrix} x_{I_1}(k) \\ x_{I_2}(k) \\ \vdots \\ x_S(k) \end{bmatrix} +$$

$$\begin{bmatrix} n_1(k) \\ n_2(k) \\ \vdots \\ n_N(k) \end{bmatrix}$$

$$= H \cdot X + N$$

Based on Equation (25), which corresponds to Equation (5), matrixes $\underline{H}$ and $\underline{Y}$ are defined as the following Equations (26) and (27).

$$\underline{H} = \begin{bmatrix} H \\ \sqrt{\alpha} \cdot I \end{bmatrix} \quad (26)$$

$$= \begin{bmatrix} \vdots & \vdots & & \vdots \\ \underline{h}_1 & \underline{h}_2 & \ldots & \underline{h}_N \\ \vdots & \vdots & & \vdots \end{bmatrix}$$

-continued $$= \begin{bmatrix} h_{I_1}^{(1)}(k) & h_{I_2}^{(1)}(k) & h_{I_3}^{(1)}(k) & \ldots & h_S^{(1)}(k) \\ h_{I_1}^{(2)}(k) & h_{I_2}^{(2)}(k) & h_{I_3}^{(2)}(k) & \ldots & h_S^{(2)}(k) \\ \vdots & \vdots & \vdots & \vdots & \vdots \\ h_{I_1}^{(N)}(k) & h_{I_2}^{(N)}(k) & h_{I_3}^{(N)}(k) & & h_S^{(N)}(k) \\ \sqrt{\alpha} & 0 & 0 & & 0 \\ 0 & \sqrt{\alpha} & 0 & \ldots & 0 \\ \vdots & \vdots & \ddots & & \vdots \\ 0 & 0 & 0 & & \sqrt{\alpha} \end{bmatrix}$$

Equation (26) corresponds to Equation (6), and is expressed as a 2N×N matrix.

$$\underline{Y} = \begin{bmatrix} Y \\ 0 \end{bmatrix} = \begin{bmatrix} y_1(k) \\ y_2(k) \\ \vdots \\ y_N(k) \\ 0 \\ 0 \\ \vdots \\ 0 \end{bmatrix} \quad (27)$$

Equation (27) corresponds to Equation (7), and is expressed as a 2N×1 matrix.

$$\tilde{x}_S(k) = \langle (H^H H + \alpha I)^{-1} \cdot H^H \rangle_N \cdot Y = \langle (\underline{H}^H \underline{H})^{-1} \cdot \underline{H}^H \rangle_N \cdot \underline{Y} \quad (28)$$

Equation (28) corresponds to Equation (8).

$$H = QR = \begin{bmatrix} \vdots & \vdots & & \vdots \\ q_1 & q_2 & \ldots & q_N \\ \vdots & \vdots & & \vdots \end{bmatrix} \cdot \begin{bmatrix} r_{11} & r_{21} & \ldots & r_{N1} \\ 0 & r_{22} & \ldots & r_{N2} \\ \vdots & \vdots & \vdots & \vdots \\ 0 & 0 & \ldots & r_{NN} \end{bmatrix} \quad (29)$$

Equation (29) corresponds to Equation (9).

$$\tilde{x}_S(k) = \langle R^{-1} \cdot Q^H \rangle_N \cdot \underline{Y} = \frac{1}{r_{NN}} \cdot q_N^H \cdot \underline{Y} \quad (30)$$

Equation (30) corresponds to Equation (10).

$$z_N = h_N - \sum_{i=1}^{N-1} \frac{(h_i^H \cdot h_N) \cdot h_i}{\|h_i\|^2} \quad (31)$$

Equation (31) corresponds to Equation (11).

$$r_{NN} = \|z_N\| \quad (32)$$

Equation (32) corresponds to Equation (12).

$$q_N = \frac{z_N}{r_{NN}} \quad (33)$$

Equation (33) corresponds to Equation (13).

$$\tilde{x}_S(k) = \langle R^{-1} \cdot Q^H \rangle_N \cdot \underline{Y} = \frac{1}{r_{NN}^2} \cdot z_N^H \cdot \underline{Y} \quad (34)$$

Equation (34) corresponds to Equation (14).

$$CSI = r_{NN}^2 \cdot \prod_{i=1}^{N-1} \|h_i\|^2 \quad (35)$$

Equation (35) corresponds to Equation (15).

$$\tilde{x}_S(k) = CSI \cdot \frac{1}{r_{NN}^2} \cdot z_N^H \cdot \underline{Y} \quad (36)$$
$$= \left( r_{NN}^2 \cdot \prod_{i=1}^{N-1} \|h_i\|^2 \right) \cdot \frac{1}{r_{NN}^2} \cdot z_N^H \cdot \underline{Y}$$
$$= u_N^H \cdot \underline{Y}$$

$$u_N = \left( r_{NN}^2 \cdot \prod_{i=1}^{N-1} \|h_i\|^2 \right) \cdot z_N \quad (37)$$
$$= \left( \prod_{i=1}^{N-1} \|h_i\|^2 \right) \cdot h_N - \sum_{i=1}^{N-1} \left( \prod_{\substack{j=1 \\ j \neq i}}^{N-1} \|h_j\|^2 \cdot (h_i^H \cdot h_N) \cdot h_i \right)$$

Equation (37) corresponds to Equation (17).

Figure 3:
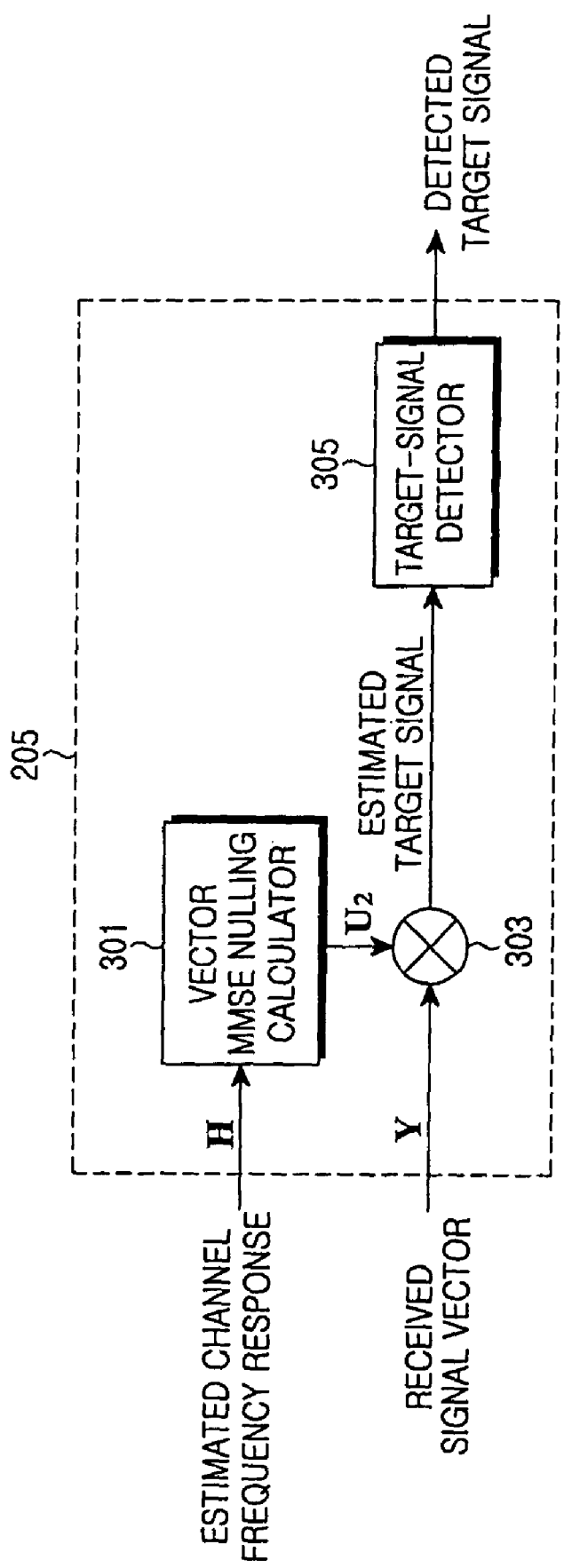
FIG. 3 is a detailed block diagram illustrating the configuration of a linear MMSE detector for canceling a neighbor cell interference according to an embodiment of the present invention.

The linear MMSE detector 205 set above has a configuration as shown in FIG. 3. FIG. 3 is a detailed block diagram illustrating the configuration of the linear MMSE detector for canceling a neighbor cell interference according to an embodiment of the present invention. For a better understanding of the present invention, the following description will be given with respect to a system model for a mobile station which has two receiving antennas, is located around a cell boundary area, and receives signals from two base stations including a serving base station and a neighbor base station, like the mobile station shown in FIG. 1, according to an embodiment of the present invention. However, it should be noted that the following method can also be applied to a system model for a mobile station which has N receiving antennas, is located around a cell boundary area, and receives signals from one serving base station and N−1 neighbor base stations, by means of Equations (23) to (35).

As shown in FIG. 3, the linear MMSE detector 205 includes an MMSE nulling vector calculator 301, a multiplier 303 and a target-signal detector 305.

The MMSE nulling vector calculator 301 calculates an MMSE nulling vector for estimating and detecting only a target signal component, with channel values estimated by the channel estimators 203 and 204.

The multiplier 303 multiplies a received and Fourier-transformed signal received from the FFT operators 201 and 202 by the MMSE nulling vector created by the MMSE nulling vector calculator 301, thereby estimating a target signal.

The target-signal detector 305 receives the estimated target signal from the multiplier 303 and performs a signal determination operation with respect to the estimated target signal, thereby detecting a target signal. The target signal may be detected through a hard decision operation, or may be detected through a soft decision operation in order to improve the performance of the decoder.

The demapper 207 of FIG. 2 extracts sub-carrier values including real data from output signals (i.e., carrier values) provided from the linear MMSE detector 205.

The decoder 209 decodes a channel decoding operation with respect to data provided from the demapper 207, with a corresponding coding rate, thereby restoring information data.

Figure 4:
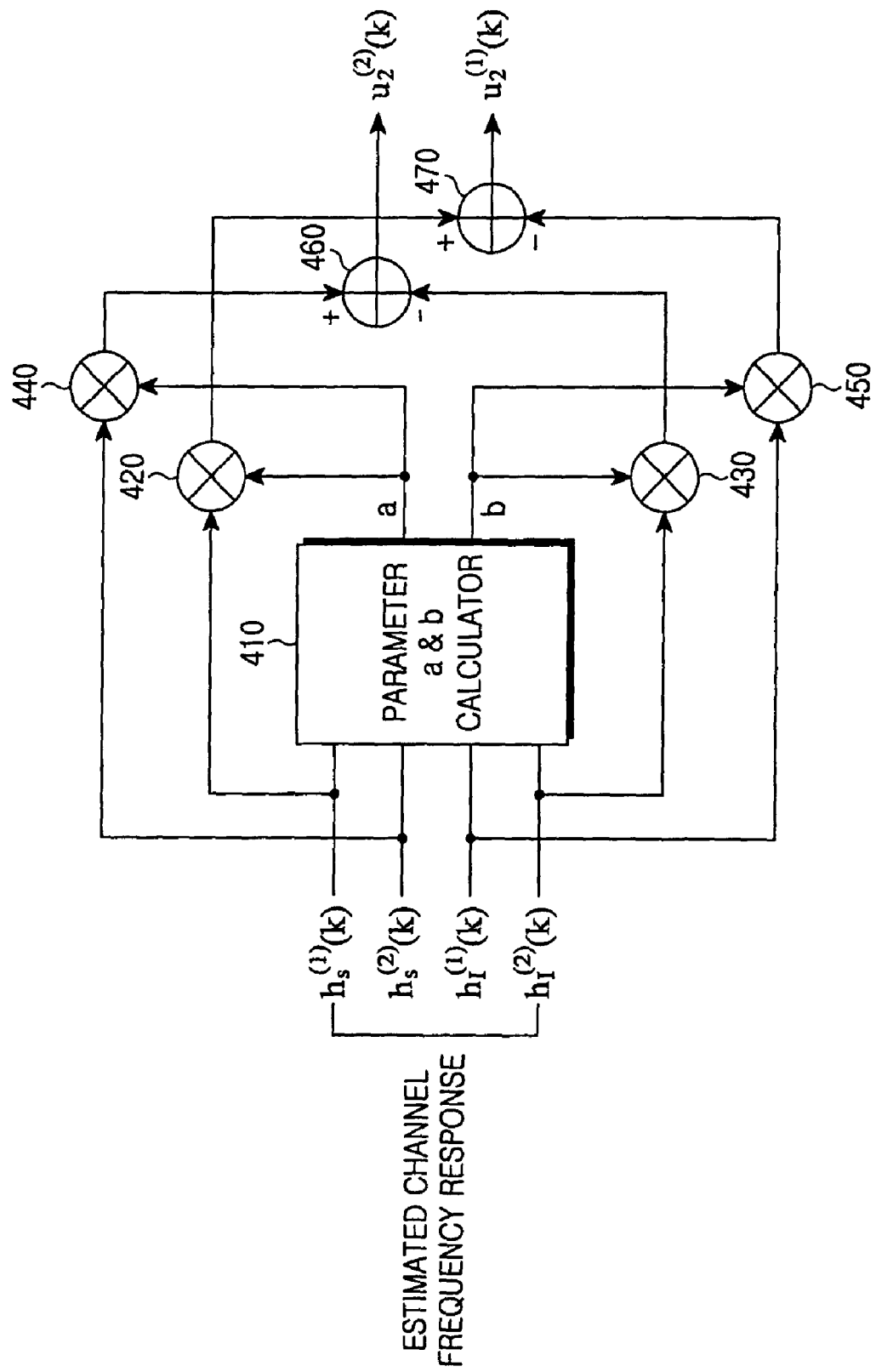
FIG. 4 is a block diagram illustrating the configuration of an MMSE nulling vector calculator according to an embodiment of the present invention.

FIG. 4 is a block diagram illustrating the configuration of the MMSE nulling vector calculator which outputs results corresponding to Equations (19) to (22) according to an embodiment of the present invention.

A parameter a&b calculator 420 calculates parameter "a" with Equation (21), and calculates parameter "b" with Equation (22), and then outputs the parameters "a" and "b" to multipliers 420, 430, 440 and 450.

The multiplier 420 multiplies an estimated channel value $h_S^{(1)}(k)$ by the parameter "a" and then outputs a result value of the multiplication to an adder 470. The multiplier 430 multiplies an estimated channel value $h_I^{(2)}(k)$ by the parameter "b" and then outputs a result value of the multiplication to an adder 460.

The multiplier 440 multiplies an estimated channel value $h_S^{(2)}(k)$ by the parameter "a" and then outputs a result value of the multiplication to an adder 460. The multiplier 450 multiplies an estimated channel value $h_I^{(1)}(k)$ by the parameter "b" and then outputs a result value of the multiplication to an adder 470.

The output $u_2^{(1)}(k)$ of the adder 470 may be expressed as Equation (19), and the output $u_2^{(2)}(k)$ of the adder 460 may be expressed as Equation (20).

Therefore, it can be understood that the output of the MMSE nulling vector calculated by the MMSE nulling vector calculator 301 corresponds to $u_2^{(1)}(k)$ and $u_2^{(2)}(k)$.

Figure 5:
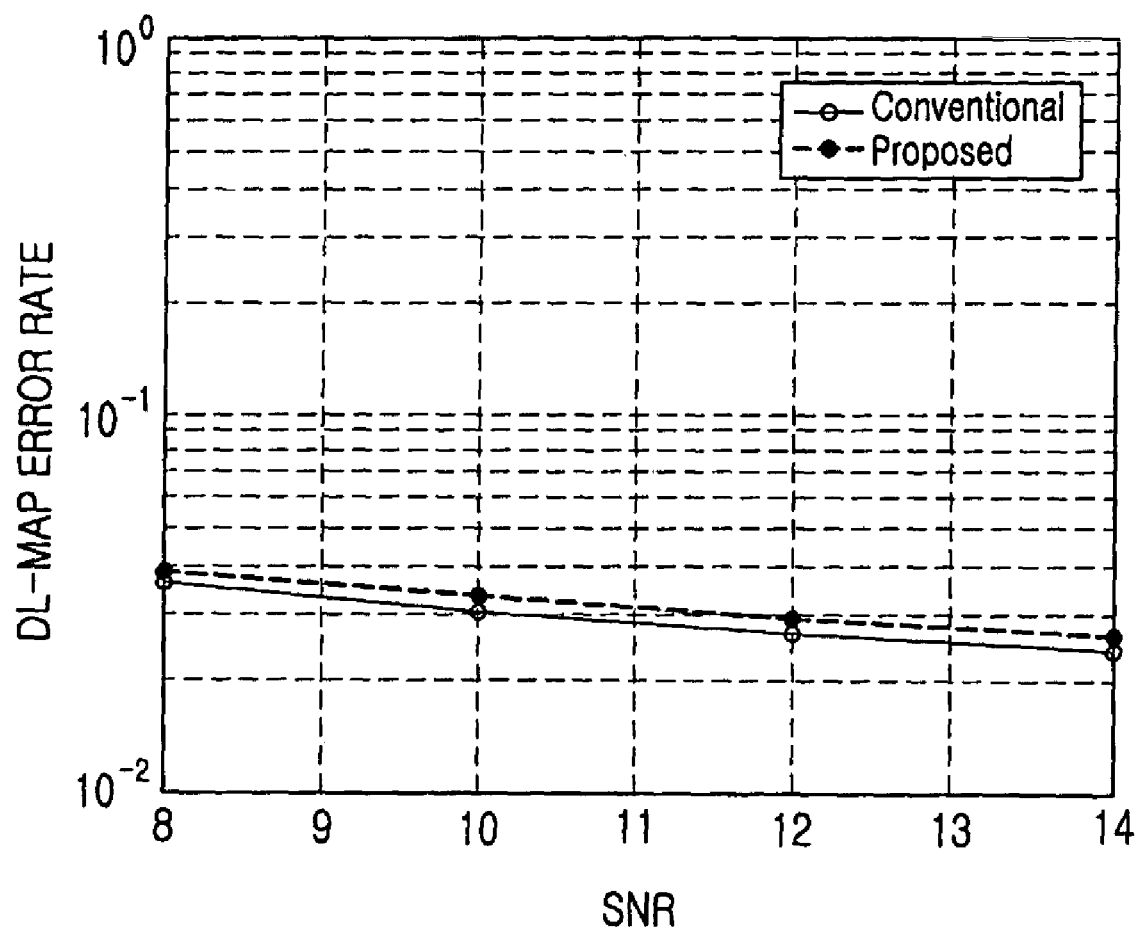
FIG. 5 is a performance graph illustrating a comparison between when the interference cancellation apparatus and method according to an embodiment of the present invention is applied and when the conventional method is applied.

Meanwhile, FIG. 5 is a performance graph illustrating a comparison between when the interference cancellation apparatus and method according to an embodiment of the present invention is applied and when the conventional method is applied. Herein, the X axis represents frequency, and the Y axis represents a DL-MAP error rate.

Referring to FIG. 5, in comparison between the present invention and the conventional method (which uses Equation (4) corresponding to the conventional original Equation), it can be understood that the DL-MAP error rate of the present invention is little higher than that of the conventional method. However, it can be understood in FIG. 5 that the present invention can be implemented with little performance difference, as compared with a conventional method using Equation (4) corresponding to the conventional original Equation.

Figure 6:
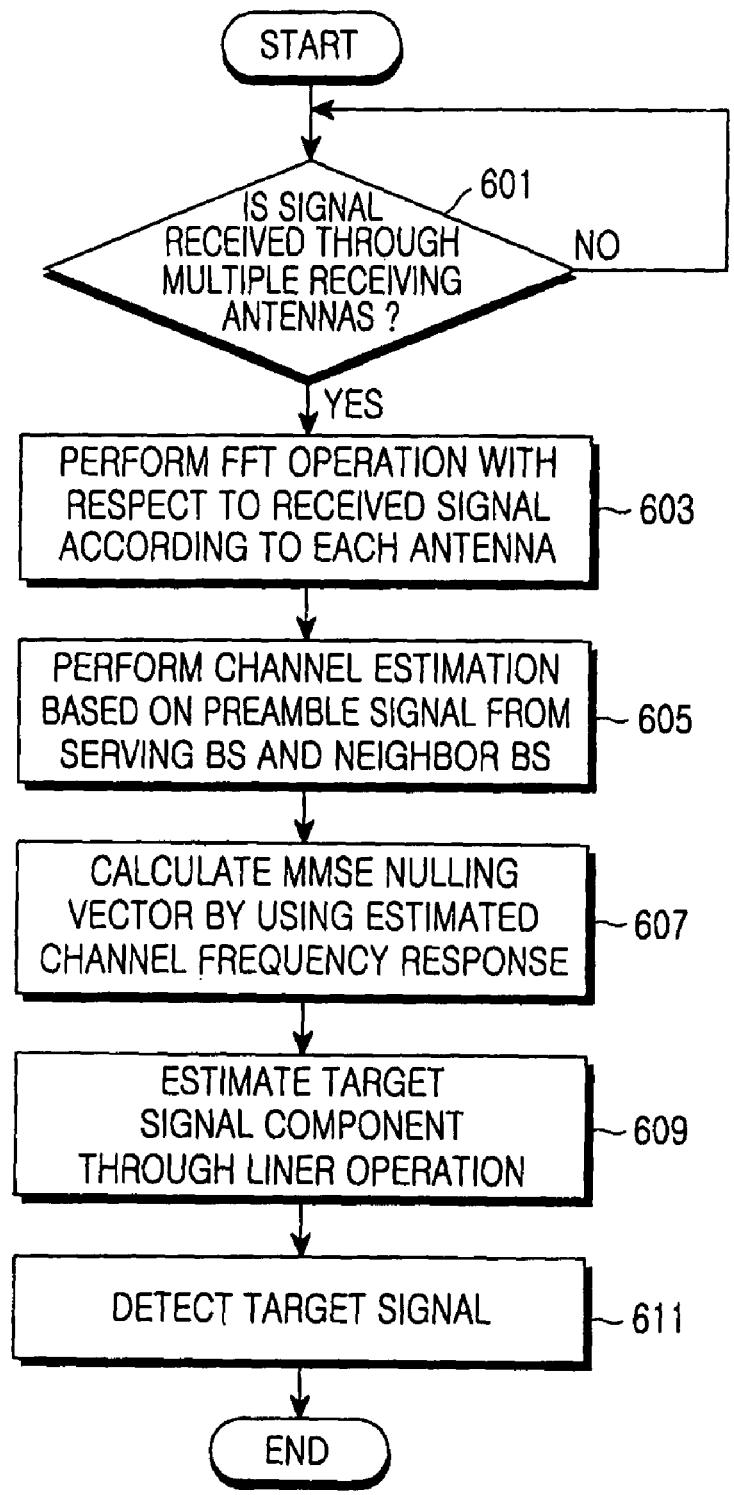
FIG. 6 is a flowchart illustrating a method for canceling a neighbor cell interference according to an embodiment of the present invention.

FIG. 6 is a flowchart illustrating the method for canceling a neighbor cell interference according to an embodiment of the present invention.

First, in step 601, a mobile station checks whether or not the mobile station has received signals through the multiple receiving antennas thereof from a serving base station and a neighbor base station.

When the mobile station has received signals, the mobile station performs a fast Fourier transform operation with respect to signals received according to each receiving antenna, thereby transforming time-domain signals into frequency-domain signals (step 603).

Thereafter, the mobile station estimates each channel $h_S^{(1)}(k)$, $h_S^{(2)}(k)$, $h_I^{(1)}(k)$ and $h_I^{(2)}(k)$ from the Fourier transformed signals by using the preamble signals of the serving base station and neighbor base station (step 605).

After estimating each channel of the serving base station and neighbor base station, the mobile station proceeds to step 607, in which the mobile station calculates an MMSE nulling vector for estimating a target signal component, by using the estimated channel values. Herein, the MMSE nulling vector is defined by Equations (19) and (22).

When the MMSE nulling vector has been obtained, the mobile station proceeds to step 609, in which the mobile station estimates the target signal component through a linear operation on the MMSE nulling vector and Fourier transformed reception signal.

Thereafter, the mobile station proceeds to step 611 of detecting a target signal by using the generated target signal component. Herein, the target signal may be detected through a hard decision operation by the target-signal detector 305 of FIG. 3, or may be detected through a soft decision operation so as to improve the performance of the decoder.

Effects of the present invention, especially the effects obtained by the above-mentioned embodiments, will now be described.

According to the present invention, it is possible to detect a target signal component independently of interference signal components with multiple receiving antennas in a broadband wireless communication system, so that a DL-MAP reception performance is improved.

Also, according to the present invention, when a linear MMSE detection technique is used to cancel an interference in the broadband wireless communication system, it is possible to reduce multiple times of complex-matrix multiplication operations and inverse-matrix operations, so that the construction of hardware becomes simplified.

In addition, according to the present invention, Equation (15) defined by the present invention is set as a channel state information value in the broadband wireless communication system, so that it is possible to reduce the complexity of the operation for an MMSE nulling vector.

While the present invention has been shown and described with reference to certain exemplary embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A mobile station for receiving a target signal and a neighbor signal through at least two receiving antennas from a serving base station and neighbor base stations, and canceling the neighbor signal from among the received signals so as to cancel a neighbor cell interference in a wireless communication system, the mobile station comprising:

an operator for performing a Fourier transform operation with respect to the target signal and neighbor signal received through each of the receiving antennas;

a channel estimator for receiving the Fourier-transformed signals from the operator, and estimating a frequency response of each channel received from the serving base station and neighbor base station; and a detector for detecting a target signal defined by a following Equation from the received signals by using the estimated channel frequency response, $$\tilde{x}_S(k) = CSI \cdot \frac{1}{r_{NN}^2} \cdot z_N^H \cdot Y$$

$$= \left( r_{NN}^2 \cdot \prod_{i=1}^{N-1} \|h_i\|^2 \right) \cdot \frac{1}{r_{NN}^2} \cdot z_N^H \cdot Y$$

$$= u_N^H \cdot Y,$$

wherein CSI refers to channel state information defined by a following Equation, $r_{NN}$ represents a QR decomposition component of a channel frequency response matrix $\underline{H}$, $\|h_i\|$ represents the norm of a frequency response, $\underline{Y}$ represents a reception signal matrix of N antennas, and $u_N$ represents a linear minimum mean square error (MMSE) detection nulling vector, $$CSI = r_{NN}^2 \cdot \prod_{i=1}^{N-1} \|h_i\|^2.$$

2. The mobile station as claimed in claim 1, wherein the CSI corresponds to channel state information of a QPSK-modulated signal.

3. The mobile station as claimed in claim 1, wherein the detector comprises:
- an MMSE nulling vector calculator for calculating an MMSE nulling vector to estimate and detect only a target signal component, by using channel values estimated by the channel estimator;
- a multiplier for estimating a target signal, by multiplying the received and Fourier-transformed signal provided from the operator by the MMSE nulling vector created by the MMSE nulling vector calculator; and
- a target-signal detector for detecting a target signal, by receiving the estimated target signal from the multiplier and performing a signal determination operation with respect to the estimated target signal.

4. The mobile station as claimed in claim 3, wherein the MMSE nulling vector calculator calculates the MMSE nulling vector defined by a following Equation, $$u_N = \left(r_{NN}^2 \cdot \prod_{i=1}^{N-1} \|h_i\|^2\right) \cdot z_N$$
$$= \left(\prod_{i=1}^{N-1} \|h_i\|^2\right) \cdot h_N - \sum_{i=1}^{N-1}\left(\prod_{\substack{j=1 \\ j\neq i}}^{N-1} \|h_j\|^2 \cdot (h_i^H \cdot h_N) \cdot h_1\right).$$

5. The mobile station as claimed in claim 3, wherein the MMSE nulling vector calculator calculates the MMSE nulling vector defined by following Equations when there is one neighbor base station and the mobile station has two antennas, $u_2^{(1)}(k) = ah_s^{(1)}(k) - bh_I^{(1)}(k),$ $u_2^{(2)}(k) = ah_s^{(2)}(k) - bh_I^{(2)}(k),$ $a = \|h_I^{(1)}(k)\|^2 + \|h_I^{(2)}(k)\|^2 = \alpha$ and $b = h_I^{(1)*}(k)h_S^{(1)}(k) + h_I^{(2)*}(k)h_S^{(2)}(k),$ wherein $u_2^{(1)}(k)$ and $u_2^{(2)}(k)$ represent approximate MMSE nulling vectors.

6. A method for canceling a neighbor signal from received signals in a mobile station, which has at least two receiving antennas to receive a target signal and the neighbor signal from a serving base station and neighbor base stations, in order to cancel a neighbor cell interference, the method comprising the steps of:

estimating each channel frequency response by using the received signals; and detecting a target signal defined by a following Equation from the received signals with the received signals and estimated channel frequency response, $$\tilde{x}_S(k) = CSI \cdot \frac{1}{r_{NN}^2} \cdot z_N^H \cdot \underline{Y}$$
$$= \left(r_{NN}^2 \cdot \prod_{i=1}^{N-1} \|h_i\|^2\right) \cdot \frac{1}{r_{NN}^2} \cdot z_N^H \cdot \underline{Y}$$
$$= u_N^H \cdot \underline{Y},$$

wherein CSI refers to channel state information defined by a following Equation, $r_{NN}$ represents a QR decomposition component of a channel frequency response matrix $\underline{H}$, $\|h_i\|$ represents the norm of a frequency response, $\underline{Y}$ represents a reception signal matrix of N antennas, and $u_N$ represents a linear minimum mean square error (MMSE) detection nulling vector, $$CSI = r_{NN}^2 \cdot \prod_{i=1}^{N-1} \|h_i\|^2.$$

7. The method as claimed in claim 6, wherein the CSI corresponds to channel state information of a QPSK-modulated signal.

8. The method as claimed in claim 6, wherein an MMSE nulling vector calculator calculates an MMSE nulling vector defined by a following Equation, $$u_N = \left(r_{NN}^2 \cdot \prod_{i=1}^{N-1} \|h_i\|^2\right) \cdot z_N = \left(\prod_{i=1}^{N-1} \|h_i\|^2\right) \cdot$$
$$h_N - \sum_{i=1}^{N-1}\left(\prod_{\substack{j=1 \\ j\neq i}}^{N-1} \|h_j\|^2 \cdot (h_i^H \cdot h_N) \cdot h_1\right).$$

9. The method as claimed in claim 6, wherein an MMSE nulling vector calculator calculates an MMSE nulling vector defined by following Equations when there is one neighbor base station and the mobile station has two antennas, $u_2^{(1)}(k) = ah_s^{(1)}(k) - bh_I^{(1)}(k),$ $u_2^{(2)}(k) = ah_s^{(2)}(k) - bh_I^{(2)}(k),$ $a = \|h_I^{(1)}(k)\|^2 + \|h_I^{(2)}(k)\|^2 = \alpha$ and $b = h_I^{(1)*}(k)h_S^{(1)}(k) + h_I^{(2)*}(k)h_S^{(2)}(k),$ wherein $u_2^{(1)}(k)$ and $u_2^{(2)}(k)$ represent approximate MMSE nulling vectors.

* * * * *